Patented June 25, 1940

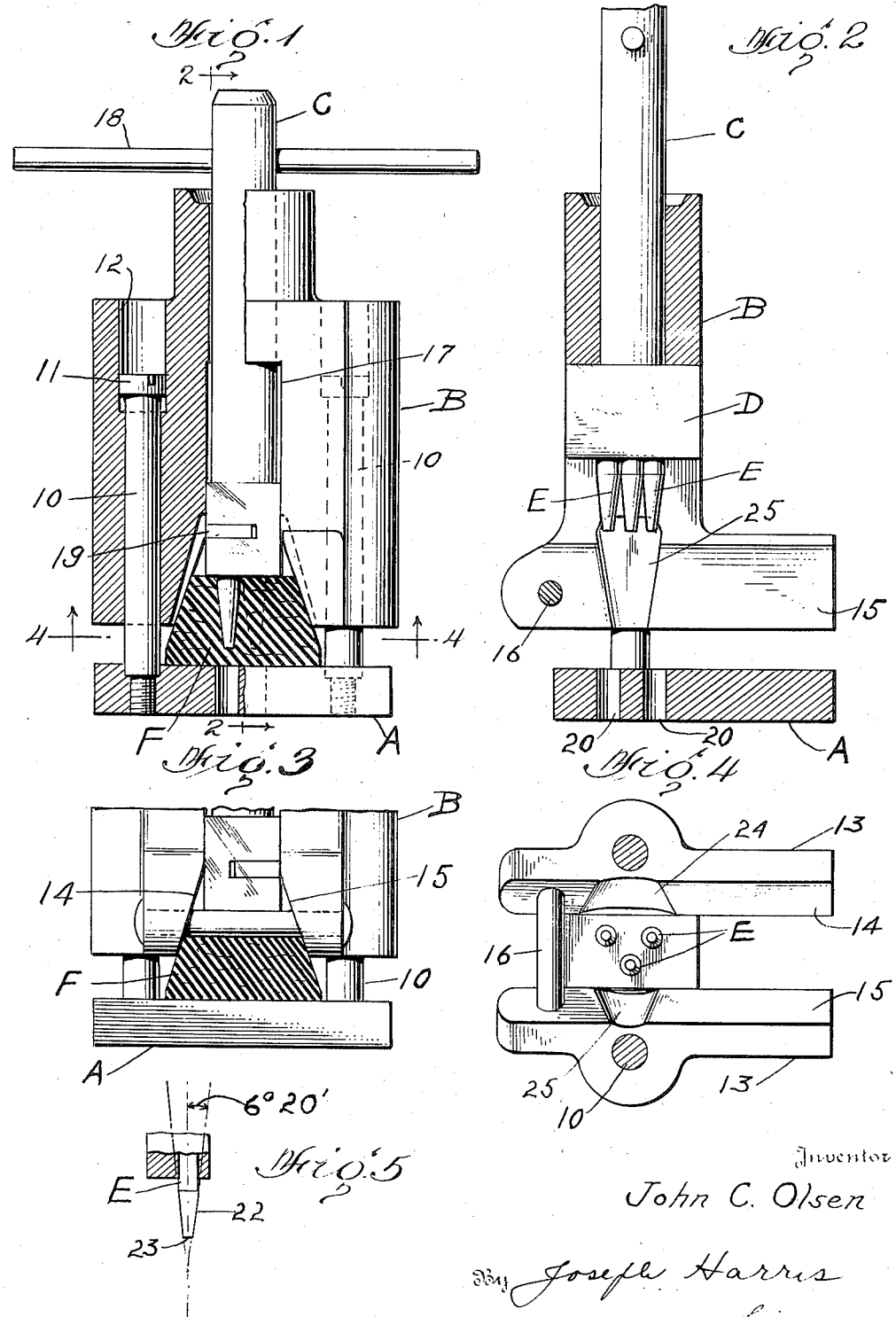

2,205,731

UNITED STATES PATENT OFFICE 2,205,731

BELT PREPARING TOOL

John C. Olsen, Chicago, Ill., assignor to Flexible Steel Lacing Company, Chicago, Ill., a corporation of Illinois Application July 14, 1938, Serial No. 219,180

4 Claims. (Cl. 164—124)

This invention relates to improvements in belt preparing tool.

One object of the invention is to provide a simple, practical and highly efficient tool for preparing the ends of V or side driving belts so designed that the belt end will be positively and substantially automatically accurately positioned during the clamping operation relative to the piercing tool, punch or other tool proper used in preparing the belt end.

Another object of the invention is to provide a tool of the character indicated in the preceding paragraph, particularly designed for piercing or punching a V-belt to facilitate the application and proper guidance of the nails or like elements customarily used in securing the fasteners to the belt ends.

A specific object of the invention is to provide a piercing tool proper of such specific design that, when used in connection with the preparation of ends of certain V-belts having a relatively high rubber content and are therefore inherently compressible and resilient, the tool will be automatically expelled from the material of the belt by the inherent elasticity of the belt material.

Specifically, an object of the invention is to provide a belt punching tool comprised, broadly, of a bottom supporting plate; a block reciprocatingly mounted relative to said plate and having formed thereon a clamping recess of flaring formation conforming to the V section of the belt with which to be used; and a stem having a crosshead carrying punches proper, which stem and crosshead are mounted in the block and adapted to be actuated preferably by a hammer or like tool.

Other objects of the invention will more clearly appear from the description and claims hereinafter following.

In the drawing forming a part of this specification, Figure 1 is a part vertical, sectional view, part rear elevational view of a tool embodying the improvements. Figure 2 is a longitudinal, vertical sectional view, corresponding substantially to the line 2—2 of Figure 1, the belt being omitted from Figure 2, and the piercing or punching tools proper being shown in an elevated position. Figure 3 is an end elevational view, showing more particularly the end gage pin and taken from the opposite direction to that of Figure 1. Figure 4 is a horizontal, sectional view corresponding to the section line 4—4 of Figure 1. And Figure 5 is a detail view illustrating more particularly one of the punching or piercing tools employed with the improved device.

In said drawing, the improved device comprises, broadly, a bottom supporting plate A; a block B; a stem C having a crosshead D at its bottom end; and a plurality of punches or piercing tools proper E—E. Other details are referred to hereinafter.

The block B is vertically, reciprocatingly or freely slidably mounted with respect to the bottom plate A, preferably by means of two vertical liner pins 10—10, the latter being threaded at their lower ends into the plate A and their shanks received in corresponding vertical openings in the block B. The screw heads 11 of the liner pins are received in enlargements 12 of the recesses in the block. With this construction, it is evident that the block B may be freely moved or reciprocated toward and from the plate A and guided with reference to the latter by the pins 10 and the two parts always maintained in assembled relation.

The block B is provided at its bottom end with rearward extensions 13—13 and formed with a longitudinally extending, combined clamping and centering recess of inverted V formation, said recess being defined by the downwardly flaring surfaces 14 and 15. As will be understood by those skilled in the art, the cross sectional contour and size of said inverted V recess in the block B will be made to correspond with or similar to the cross section and size of the belt end indicated at F on which the tool is intended to act, as clearly shown in Figures 1 and 2. In actual practice, the maximum width of said recess 14—15 will be somewhat less than the maximum width of the belt or belts with which to be used so as to positively insure that there shall always be a space between the opposed faces of the block B and the bottom plate A when the belt is in clamped position, as shown in Figures 1 and 3.

By reason of the construction and relationship of the plate A and block B, it will be evident that, when the belt end has been inserted between the plate A and block B with the latter in an elevated position, downward movement of the block B will automatically center the belt end transversely of the V recess 14—15 and hence positively insure the proper position of the belt end transversely of the block B as the belt end is clamped. In this connection, it will be seen from the drawing that the block B is made of solid metal and hence relatively heavy so that, after being elevated and released, will fall under the influence of gravity and substantially automatically center a belt end placed thereunder.

Proper positioning of the belt end, endwise of the latter, is obtained by reason of the horizontally and transversely extending gage pin 16, preferably carried by the block B and located as best shown in Figure 2.

The stem C is vertically freely slidably or reciprocatingly mounted in a suitable vertical recess in the block B and has secured thereto, at its lower end, the crosshead D, which, in turn, is slidably or reciprocatingly mounted and guided in a laterally opening recess 17 in the block B. The stem C is of such length as to extend above the top of the block B in any position of the parts so that it may be actuated, preferably by a hammer or the like, to drive the piercing tools or punches proper into the belt, as hereinafter described. To facilitate handling of the tool, the stem C preferably is provided with a cross pin 18. As will be apparent, by lifting the stem C through the cross pin 18, the cross head D will be elevated until it engages the shoulders at the upper end of the recess 17, and thereupon the block B will also be elevated or separated from the bottom plate A.

The tool chosen for illustration is one primarily intended for punching or piercing a belt end at three points for the reception of three nails or securing elements for V-belt fasteners such as shown, for instance, in Figure 5 of my co-pending application No. 190,399, filed February 14, 1938, now Patent 2,170,973, granted August 29, 1939. As shown in said patent, the three nails are arranged two in tandem lengthwise of the belt and the third intermediate the first two, but offset to one side. As will be apparent from Figure 4, the piercing or punching tools proper E, are correspondingly arranged so as to enter the belt at points corresponding to the three securing nails of said type of attachment. As will be understood by those skilled in the art, however, the number of punching or piercing tools may be varied and/or their relative positions.

In the specific embodiment of the invention chosen for illustration in the present application, the piercing or punching tools E are preferably held in the crosshead D by means of a key plate 19 which, as will be understood by those skilled in the art, may be removed and the parts E in turn removed or replaced as may become necessary. The bottom plate A will preferably be provided with apertures 20—20 in alinement with the respective punching or piercing tools proper E so as to prevent them from impinging upon the metal of the plate A at any time.

As is well known, all V or side driving belts are of inherent resiliency and elasticity. Practically all of the commercial types of V-belts on the market are composed in part of fabric or cords or both, the same being impregnated with rubber so as to provide the usual V cross section for side driving use. One of the important features of the present invention is to utilize this inherent elastic characteristic of certain of the V-belts now on the market. To this end, the piercing or punching tools E are of special design. In the first place, they are preferably made of such length that the extended portions thereof below the crosshead D will be less than the radial thickness of the belt to be prepared, so that there will not be a complete passage through the belt. In the second place, each tool E is solid and of circular cross section with the lower end thereof of truncated conical form, as indicated at 22 in Figure 5. This construction provides a flat or blunt penetrating end, as indicated at 23 which end, in actual practice will preferably be of substantially 2/64" to 5/64", dependent upon the size belt being prepared. The inclination of the side surface of the conical section 22 relative to the axis of the punch is also important in attaining the automatic ejection hereinbefore referred to. For a well known V-belt material now in quite extensive commercial use, such preferred angle is 6°20', although a reasonable variation may be allowed of, say, within the limits of 5° and 7°. With punching or piercing tools E so constructed and used in conjunction with V-belts having such elastic characteristics, and which tools are prevented from completely penetrating the belt and do not remove any of the material, the inherent resiliency of the belt material will automatically force the ejection of the tools from the belt upwardly in a device of the character shown and illustrated, it being of course assumed that the stem and crosshead C—D have been relieved of any actuating force or downward pressure.

During the penetration of the punching or piercing tools proper into the belt, there is a natural tendency for the belt material to spread laterally and in order that this spreading action may be accommodated and thus prevent any displacement of the holes which might otherwise result, the side walls 14 and 15 are recessed or undercut, as indicated at 24 and 25, respectively. Said recesses are relatively shallow and of more or less arcuate cross section, the recess 24 which is adjacent the tandem pair of punching or piercing tools being somewhat wider than the recess 25 which is adjacent the single offset punching or piercing tool, as best shown in Figure 4. As will be understood, when the tools E are removed from the belt, the latter assumes its normal cross section and the holes or incisions substantially close up, but nevertheless readily receive and accurately guide the securing nails when the latter are applied to attach the belt end fasteners.

Although there has herein been shown and described what is now considered the preferred manner of carrying out the invention, the same is by way of illustration only and not by way of limitation. All changes and modifications are contemplated that come within the scope of the claims appended hereto.

What is claimed is:

1. In a tool of the character described, the combination with a bottom supporting plate; of a block reciprocatingly mounted relative to said plate, said block, on the bottomside adjacent the plate, being provided with a downwardly flared recess of cross section corresponding to that of the belt to be acted upon; a plurality of punch-like tools proper freely vertically slidably mounted in said block and adapted to engage the belt when the latter is clamped in said recess between the block and plate, the flaring sides of said recess of the block, in alinement with said tools proper, being outwardly recessed to temporarily accommodate material of the belt displaced by and while said tools proper are embedded therein.

2. In a tool for preparing ends of V belts and the like, the combination with a bottom supporting plate; of a block; guide pins secured to the bottom plate, the block being recessed to receive said guide pins and freely slidable thereon toward and from the bottom plate, said block being provided on the face opposed to the plate, with a recess flaring toward the plate and of a cross section and size similar to those of the belt to be prepared; a cross head slidably mounted in the block within the flaring recess; a stem secured to the cross head, the block being recessed to slidably receive the stem and the latter being of such length as to extend above the block and adapted to be actuated as by a hammer, the crosshead and block having cooperable shoulders, whereby, upon lifting of the stem the crosshead will engage the block and retract the latter from the bottom plate; and a tool carried by the crosshead adapted to act upon the belt end when positioned within the recess of the block.

3. In a tool for piercing holes in V belts or the like, composed in part of compressible and elastic material, the combination of a support for the V belt; of means for clamping the V belt against the support; and means for partially piercing the belt comprising a shouldered member and a piercing tool proper extending from the face of the shouldered member, the piercing tool proper having a blunt penetrating end and a conical shank tapering from the shouldered face to the blunt end, the angle between the side surface and the axis of the conical shank being between the limits of 5° and 7° and the length of the shank being less than the thickness of the belt to be pierced whereby, when the tool is driven into the compressible and elastic belt, the degree of penetration is limited to less than complete penetration by engagement of said shoulder with the belt and, upon discontinuance of the actuating pressure, the reaction from the inherent resiliency of the belt material will automatically expel the tool.

4. In a tool for preparing ends of V-belts and the like, the combination with a bottom supporting member; of a relatively heavy block member positioned above the supporting member and having, on its bottom side, a recess flaring toward the bottom supporting member and of cross section and size similar to those of the belt to be treated whereby, when a belt end is positioned between said members and said block member allowed to move toward the bottom supporting member, the belt end will be accurately positioned transversely of and within the flaring recess of the block member and directly clamped between the latter and the bottom supporting member, said block member having also a vertically extending stem-guide recess communicating with said flaring recess; means connecting said members, said means being fixed to one of said members and the other member freely slidable on and guided by the connecting means whereby the two members may freely move toward and from each other; and a tool having a stem freely slidable in said stem-guide recess of the block member and adapted to be actuated toward the supporting member independently of any movement of the block member to thereby operate upon the belt when the latter is clamped between said members.

JOHN C. OLSEN.